(12) United States Patent
Catalano (10) Patent No.: US 7,232,976 B1
(45) Date of Patent: Jun. 19, 2007

(54) THERAPEUTIC MOUSE PAD

(76) Inventor: Dino A. Catalano, P.O. Box 721034, Roselle, IL (US) 60172

( * ) Notice: Subject to any disclaimer, the term of this patent is extended or adjusted under 35 U.S.C. 154(b) by 0 days.

(21) Appl. No.: 11/333,026

(22) Filed: Jan. 18, 2006

(51) Int. Cl.
*H05B 1/00* (2006.01)

(52) U.S. Cl. ...................... 219/209; 219/549; 219/217; 345/163; 601/146

(58) Field of Classification Search ............... 219/209, 219/217, 200–201, 528–529; 345/163; 601/146
See application file for complete search history.

(56) References Cited

U.S. PATENT DOCUMENTS

| | | |
|---|---|---|
| D372,903 S | 8/1996 | Juster |
| 5,566,913 A | 10/1996 | Prokop |
| 5,599,280 A | 2/1997 | Wolden |
| 5,674,423 A * | 10/1997 | Wright, Sr. ............... 219/549 |
| 5,989,400 A | 11/1999 | Islam |
| 6,083,180 A * | 7/2000 | Shimizu ...................... 601/50 |
| 6,323,841 B1 * | 11/2001 | Lai ........................... 345/163 |
| 6,599,259 B2 * | 7/2003 | Muir .......................... 601/46 |
| 2004/0238527 A1 | 12/2004 | Ozawa et al. |

* cited by examiner

*Primary Examiner*—Philip H. Leung
*Assistant Examiner*—Vinod Patel (57) ABSTRACT

A mouse pad includes a body with planar top and bottom surfaces and a cavity intercalated therebetween that extends between opposed body ends. A rotatable flange has a dome shape for fitting within a user's palm. The flange is offset from a center of the body, has a bottom section conjoined to the body top surface, and is seated adjacent to a proximal body edge. The flange has a top section rotatably conjoined to the bottom section. The bottom section has a greater diameter than the top section for effectively. A mechanism is included for heating the flange that is connected to the flange top section and includes a controller conjoined to the body. A mechanism is included for oscillating the flange so that the flange tilts side-to-side and against a bottom surface of an operator wrist. The heating mechanism and the oscillating mechanism are independently and simultaneously operable.

15 Claims, 7 Drawing Sheets

THERAPEUTIC MOUSE PAD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to mouse pads and, more particularly, to a therapeutic mouse pad for use with computer peripherals and the like.

2. Prior Art

It is a well known fact that using a personal computer or laptop for extended periods of time can cause significant amounts of strain and tension one's wrist, arm, neck, shoulders and back. This is especially true of persons, such as engineers, architects and graphics designers, who use the mouse more so than the keyboard. Such strain and tension has been related to various cumulative trauma disorders, or CTD. One of the most common of these is carpal tunnel syndrome (CTS) which is caused by compression or squeezing of the median nerve in the individual's wrist. The eight carpal bones of the wrist forms a tunnel, and the medial nerve travels therethrough towards the hand. The tendons of the finger flexor muscles also traverse through this tunnel. When using a keyboard and a computer mouse, these tendons are repeatedly flexed and the carpal bones exert a constant pressure on the medial nerve.

Under circumstances of overuse or improper use, the finger flexor muscle tendons may become swollen, and the medial nerve may become hypersensitive. This in turn will lead to aches and pains in one's wrist, and cause a person to reach a point of fatigue much faster than a healthy person. Common symptoms of CTS include pain, numbness, tingling, or a "funny feeling" in the fingers, hand or wrist.

Another, more common, though less publicized CTD, is shoulder-and-neck-strain syndrome (SNSS). SNSS originates with muscles located between the neck and shoulders. SNSS is most common among people who keep their shoulders elevated or shrugged for extended periods. A typical example of this is elevating ones elbows and forearms at a desk while typing on a keyboard or manipulating a mouse. SNSS can result in anything ranging from a tight neck to a severely incapacitating pain in the neck, shoulders, forearm, and/or hand. It can also result in weakness and premature fatiguing in any or all of these areas.

The widespread proliferation of the computer mouse has greatly contributed to the significant increase in incidences of the CTS and SNSS. CTS and SNSS are serious conditions that can lead to permanent damage of the muscles, nerves and joints. It is well known that heat and massage applications can effectively be used in the therapeutic treatment of injured muscles. Thus, it would be advantage to regularly administer such heat and massage treatments to the areas most frequently affected namely one's hands and wrists.

Accordingly, a need remains for a therapeutic mouse pad in order to overcome the above-noted shortcomings. The present invention satisfies such a need by providing a mouse pad that is convenient and easy to use, provides strain and pain relief, and is light weight in design. Such a mouse pad helps solve the problem associated with CTS and SNSS by warming and massaging the user's wrist while they are holding and manipulating a computer mouse. This soothes and comforts the wrist during extended periods of computer work. By maintaining a relaxed state in the wrist and hand muscles the incidence of CTD can advantageously be greatly reduced.

BRIEF SUMMARY OF THE INVENTION

In view of the foregoing background, it is therefore an object of the present invention to provide a therapeutic mouse pad. These and other objects, features, and advantages of the invention are provided by a mouse pad for use with computer peripherals and the like.

The mouse pad includes a body with planar top and bottom surfaces that have a fixed spatial relationship. Such a body further has a continuous and hollow cavity intercalated between the top and bottom surfaces that extends between opposed end portions of the body.

A rotatable flange is included that has a dome shape suitably sized for fitting within a palm of an operator's hand. Such a flange is offset from a center of the body. The flange has a bottom section statically and directly conjoined to the top surface of the body. Such a flange is seated adjacent to a proximal edge of the body. The flange further has a top section directly and rotatably conjoined to the bottom section wherein the operator can selectively bias the top section of the flange about a vertical axis registered orthogonal to the body. Such a bottom section has a diameter greater than the top section for effectively supporting the top section upwardly and away from the top surface of the body.

A mechanism is included for heating the flange during operating conditions. Such a heating mechanism is directly connected to the top section of the flange and includes a controller directly conjoined to an outer perimeter of the body. The heating mechanism preferably includes a voltage regulator electrically coupled to the controller. A heating element is electrically coupled to the voltage regulator. Such a heating element is channeled through the cavity and upwardly into the flange wherein the heating element terminates within the top section of the flange.

A mechanism is included for oscillating the flange about a horizontal axis registered parallel to the top surface of the body such that the flange tilts side-to-side and against a bottom surface of an operator wrist during operating conditions. The heating mechanism and the oscillating mechanism are independently and simultaneously operable. The oscillating mechanism preferably includes a controller that is electrically and directly coupled to the external power supply source. A motor and an associated piston are directly conjoined thereto. Such a motor is selectively operable in such a manner that the piston is caused to extend and retract along a rectilinear path between the top and bottom sections of the flange. The motor is directly attached to the bottom section of the flange and the piston is telescopically engageable with the top section of the flange. The piston preferably travels along a linear path registered orthogonally to the shaft.

The controller is also electrically coupled to an external power supply source and is responsive to a user input. The controller generates and transmits a control signal to the voltage regulator for controlling the amount of current passing to the heating element, thereby effectively and conveniently regulating an operating temperature of the heating element as desired by the user.

A switch is seated medially of the controller and the motor. Such a switch effectively interrupts power when the controller is toggled to an off position. A fulcrum shaft has an elongated and rectilinear length oriented parallel to the bottom section of the flange. Such a shaft is intercalated between the top and bottom sections of the flange such that the top section of the flange is caused to articulate about the shaft when the piston is biased between extended and retracted positions respectively. The shaft may be registered orthogonal to a vertical plane and has an annular cross-section for guiding the top section of the flange thereabout.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-9 by the reference numeral 10 and is intended to provide a therapeutic mouse pad. It should be understood that the device 10 may be used to provide therapeutic treatments in many different types of settings and should not be limited by being used with only a computer mouse.

Figure 1:
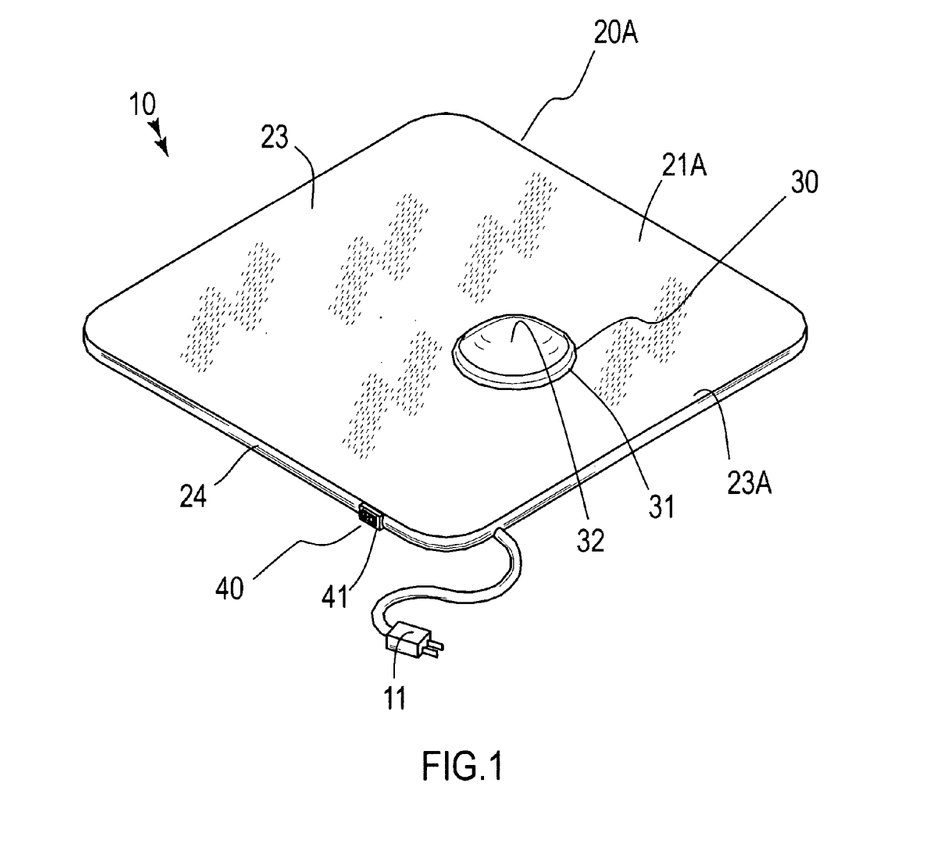
FIG. 1 is a perspective view showing a therapeutic mouse pad, in accordance with the present invention.
Figure 2:
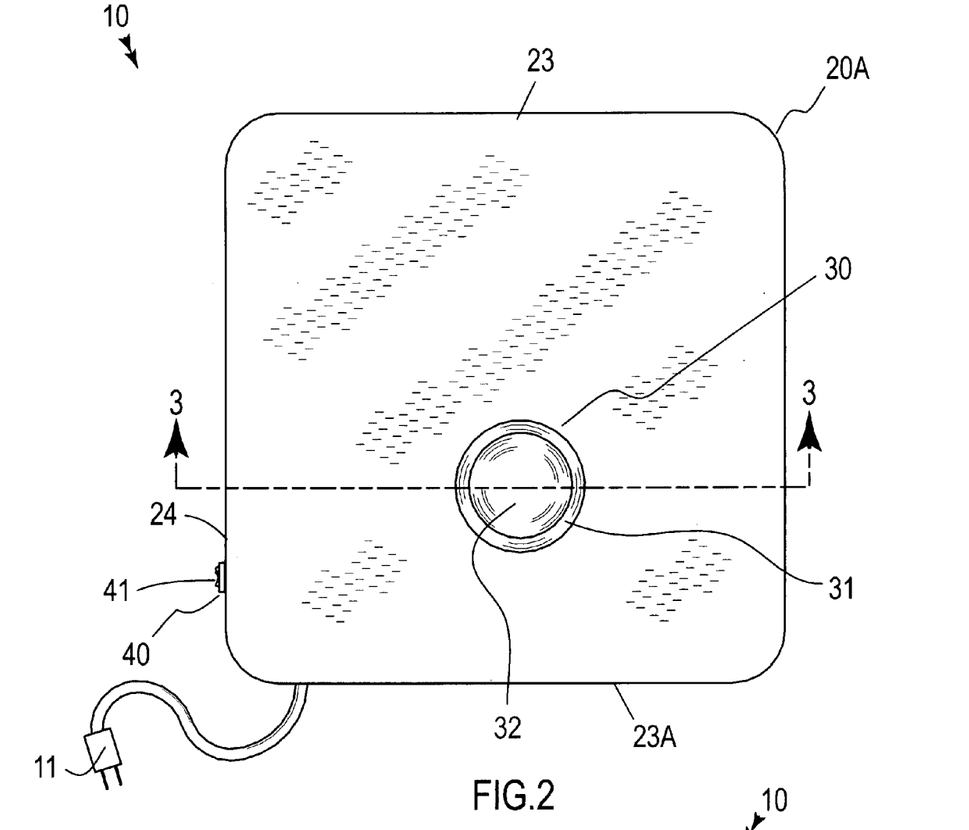
FIG. 2 is a top plan view of the device shown in FIG. 1.
Figure 3:
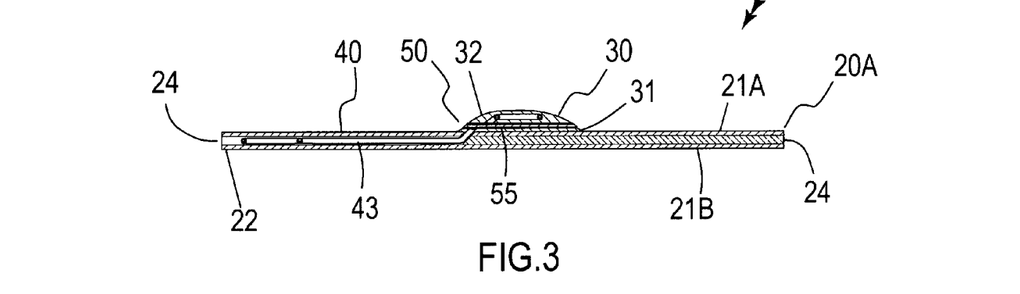
FIG. 3 is a cross-sectional view of the device shown in FIG. 2, taken along line 3-3.
Figure 4:
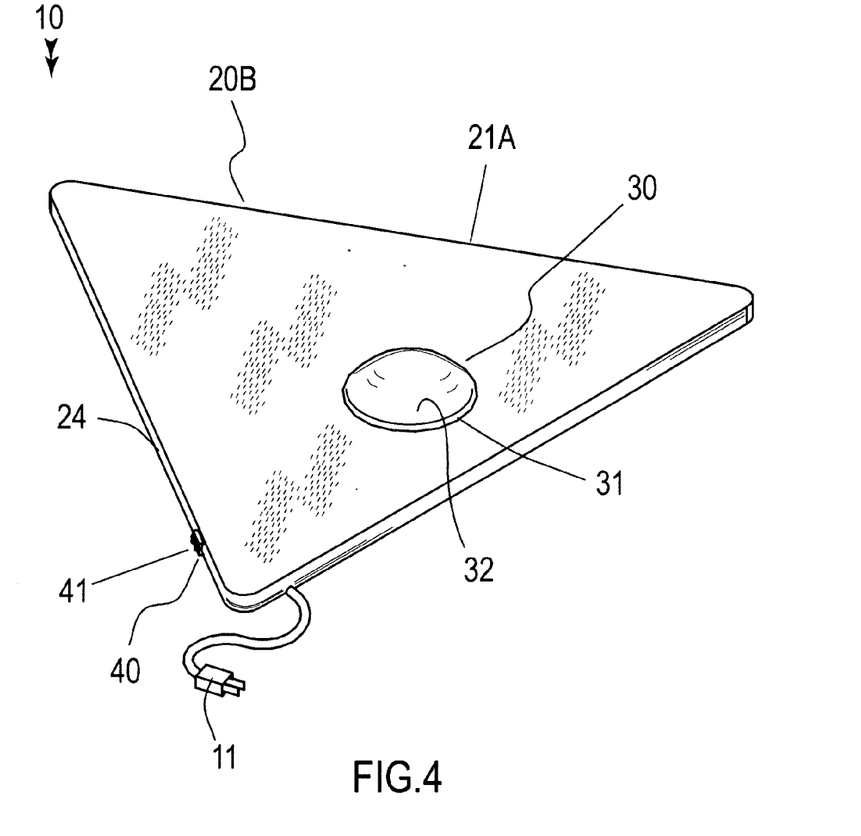
FIG. 4 is a perspective view showing a therapeutic mouse pad having a triangular body, in accordance with the present invention.
Figure 5:
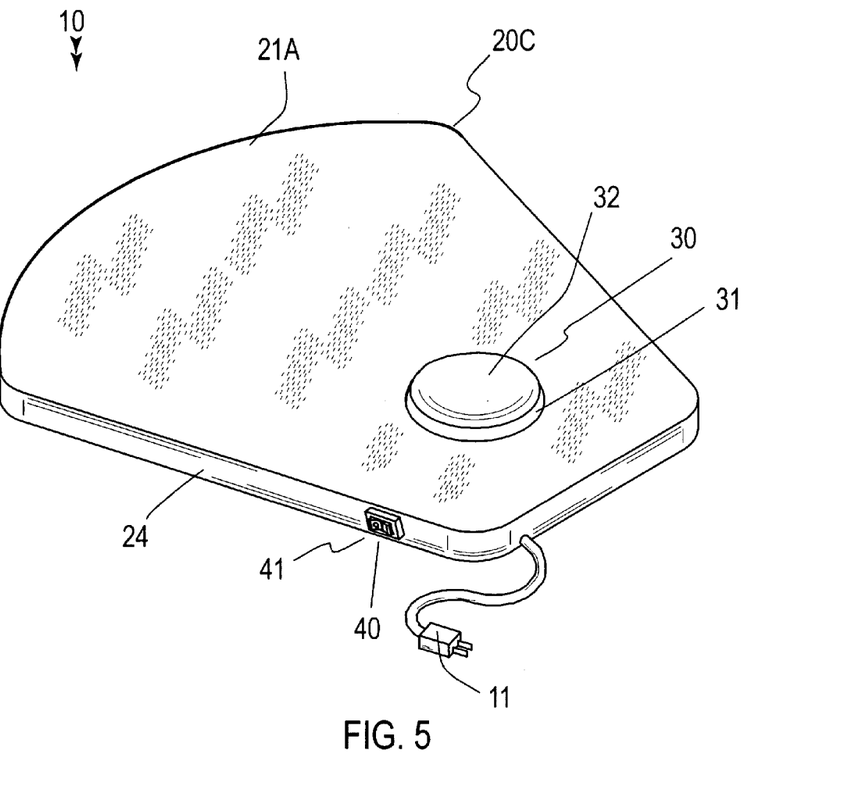
FIG. 5 is a perspective view showing a therapeutic mouse pad having a fan shaped body, in accordance with the present invention.
Figure 6:
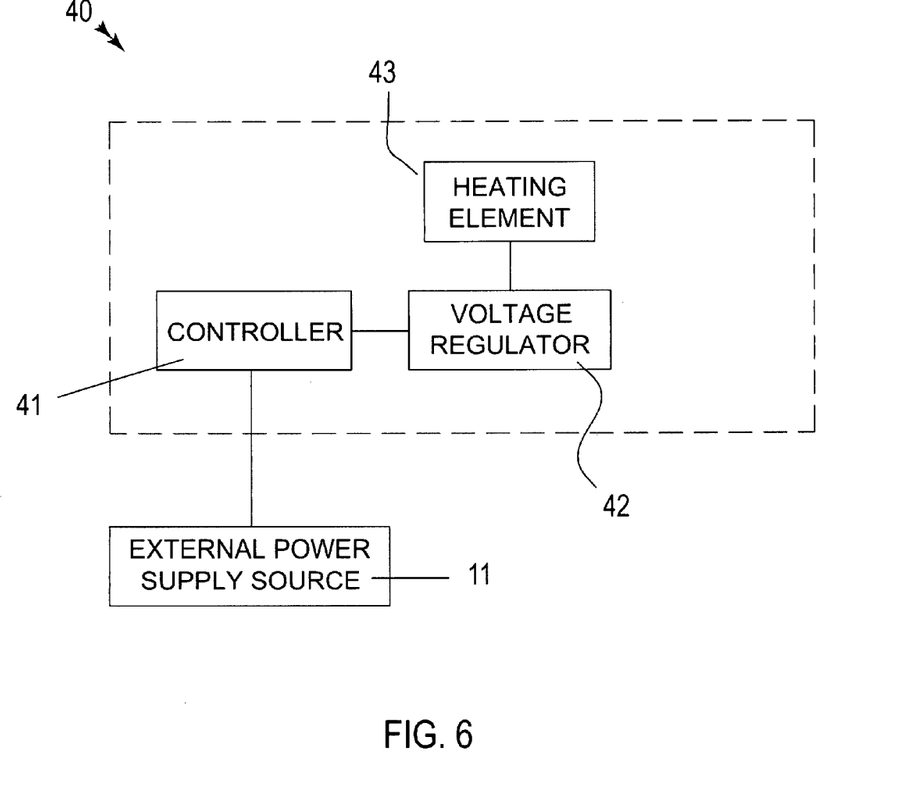
FIG. 6 is a schematic block diagram showing a heating mechanism, in accordance with the present invention.

Referring initially to FIGS. 1, 2, 3, 4 and 5, the device 10 includes a body 20 with planar top 21A and bottom 21B surfaces that have a fixed spatial relationship. Such a body 20 further has a continuous and hollow cavity 22 intercalated between the top 21A and bottom 21B surfaces that extends between opposed end portions 23 of the body 20. The body 20 is produced in a plurality of shapes ranging from a rectangular body 20A, a triangular body 20B and a fan shaped body 20C, as is illustrated in FIGS. 1, 4 and 5, respectively. Of course, the body 20 may be produced in a variety of alternate shapes and sizes, as is obvious to a person of ordinary skill in the art.

Referring to FIGS. 1, 2, 3, 4, 5, 7 and 8, a rotatable flange 30 is included that has a dome shape suitably sized for conveniently fitting within a palm of an operator's hand. Such a flange 30 is offset from a center of the body 20. The flange 30 has a bottom section 31 that is statically and directly conjoined, without the use of intervening elements, to the top surface 21A of the body 20. Such a flange 30 is seated adjacent to a proximal edge 23A of the body. Of course, the flange 30 may be located at any other suitable position along the top surface 21A of the body 20, as is obvious to a person of ordinary skill in the art. The flange 30 further has a top section 32 directly and rotatably conjoined, without the use of intervening elements, to the bottom section 31 wherein the operator can selectively bias the top section 32 of the flange 30 about a vertical axis registered orthogonal to the body 20. Such a bottom section 31 has a diameter greater than the top section 32, which is essential for effectively supporting the top section 32 upwardly and away from the top surface 21A of the body 20.

Figure 8:
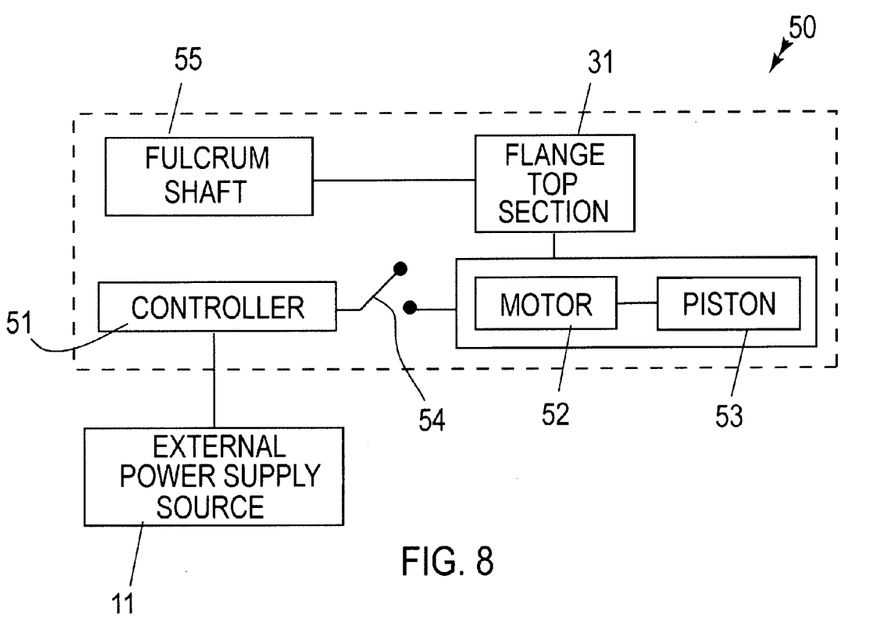
FIG. 8 is a schematic block diagram of the oscillating mechanism shown in FIG. 3.
Figure 9:
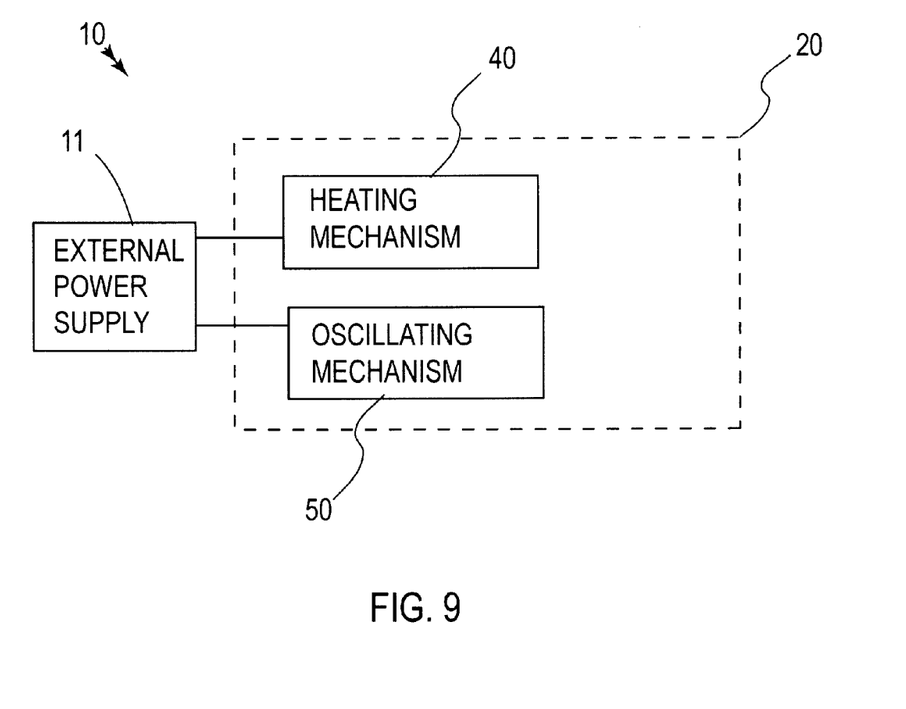
FIG. 9 is a schematic block diagram of the device shown in FIG. 1.

Referring to FIGS. 3, 8 and 9, a mechanism 40 is included for heating the flange 30 during operating conditions. Such a heating mechanism 40 is directly connected, without the use of intervening elements, to the top section 32 of the flange 30 and includes a controller 41 directly conjoined, without the use of intervening elements, to an outer perimeter 24 of the body 20. The heating mechanism 40 includes a voltage regulator 42 electrically coupled to the controller 41. A heating element 43 is electrically coupled to the voltage regulator 42. Such a heating element 43 is channeled through the cavity 22 and upwardly into the flange 30 wherein the heating element terminates 43 within the top section 32 of the flange 30.

Figure 7:
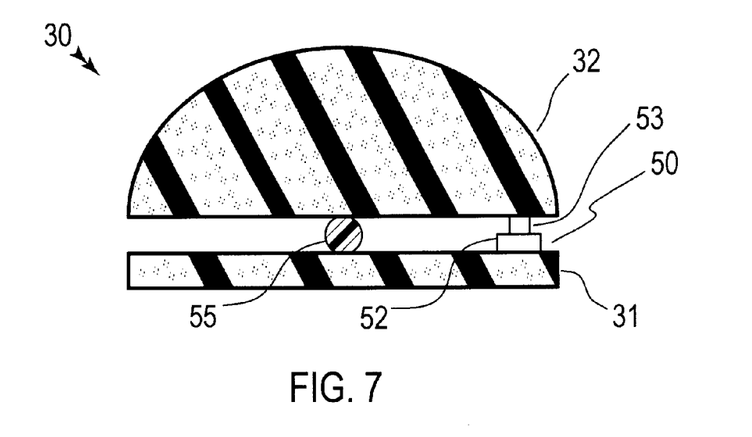
FIG. 7 is cross-sectional view of the flange shown in FIG. 1, taken along line 7-7.

Referring to FIGS. 7, 8 and 9, a mechanism 50 is included for oscillating the flange 30 about a horizontal axis registered parallel to the top surface 21A of the body 20, which is crucial such that the flange 30 tilts side-to-side and against a bottom surface of an operator wrist during operating conditions for providing soothing relief to the user's wrist muscles and tendons. The heating mechanism 50 and the oscillating mechanism 40 are independently and simultaneously operable.

The oscillating mechanism 50 includes a controller 51 that is electrically and directly coupled, without the use of intervening elements, to the external power supply source 11. A motor 52 and an associated piston 53 are directly conjoined thereto, without the use of intervening elements. Such a motor 52 is selectively operable in such a manner that the piston 53 is caused to extend and retract along a rectilinear path between the top 32 and bottom 31 sections of the flange 30. The motor 52 is directly attached, without the use of intervening elements, to the bottom section 31 of the flange 30 and the piston 53 is telescopically engageable with the top section 32 of the flange 30, as is best shown in FIG. 7. The piston 53 travels along a linear path registered orthogonally to the shaft 9 described herein below).

Referring to FIGS. 3, 7, and 8, the controller 51 is also electrically coupled to an external power supply source 11 and is responsive to a user input. The controller 51 generates and transmits a control signal to the voltage regulator 42, which is vital and advantageous for controlling the amount of current passing to the heating element 43, thereby effectively and conveniently regulating an operating temperature of the heating element 43 as desired by the user. A switch 54 is seated medially of the controller 51 and the motor 52. Such a switch 54 effectively interrupts power when the controller 51 is toggled to an off position.

A fulcrum shaft 55 has an elongated and rectilinear length oriented parallel to the bottom section 31 of the flange 30. Such a shaft 55 is intercalated between the top 32 and bottom 31 sections of the flange 30 such that the top section 32 of the flange 30 is effectively caused to articulate about the shaft 55 when the piston 53 is biased between extended and retracted positions respectively. The shaft 55 is registered orthogonal to a vertical plane and has an annular cross-section for guiding the top section 32 of the flange 30 thereabout.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A mouse pad for use with computer peripherals and the like, said mouse pad comprising:
    a body including planar top and bottom surfaces having a fixed spatial relationship, said body further having a continuous and hollow cavity intercalated between said top and bottom surfaces and extending between opposed end portions of said body;
    a rotatable flange having a dome shape suitably sized for fitting within a palm of an operator's hand, said flange having a bottom section statically and directly conjoined to said top surface of said body, said flange further having a top section directly and rotatably conjoined to said bottom section wherein the operator can selectively bias said top section of said flange about a vertical axis registered orthogonal to said body, said bottom section having a diameter greater than said top section for supporting said top section upwardly and away from said top surface of said body;
    means for heating said flange during operating conditions, said heating means being directly connected to said top section of said flange and including a controller directly conjoined to an outer perimeter of said body; and
    means for oscillating said flange about a horizontal axis registered parallel to said top surface of said body such that said flange tilts side-to-side and against a bottom surface of an operator wrist during operating conditions;
    wherein said heating means and said oscillating means are independently and simultaneously operable.

2. The device of claim 1, wherein said heating means comprises:
    a voltage regulator electrically coupled to said controller; and
    a heating element electrically coupled to said voltage regulator, said heating element being channeled through said cavity and upwardly into said flange wherein said heating element terminates within said top section of said flange;
    wherein said controller is electrically coupled to an external power supply source and is responsive to a user input, said controller generating and transmitting a control signal to said voltage regulator for controlling the amount of current passing to said heating element and thereby effectively regulating an operating temperature of said heating element as desired by the user.

3. The device of claim 1, wherein said oscillating means comprises:
    a controller electrically and directly coupled to the external power supply source;
    a motor and an associated piston directly conjoined thereto, said motor being selectively operable in such a manner that said piston is caused to extend and retract along a rectilinear path between said top and bottom sections of said flange, wherein said motor is directly attached to said bottom section of said flange and said piston is telescopically engageable with said top section of said flange;
    a switch seated medially of said controller and said motor, said switch interrupting power when said controller is toggled to an off position; and
    a fulcrum shaft having an elongated and rectilinear length oriented parallel to said bottom section of said flange, said shaft being intercalated between said top and bottom sections of said flange such that said top section of said flange is caused to articulate about said shaft when said piston is biased between extended and retracted positions respectively.

4. The device of claim 3, wherein said shaft is registered orthogonal to a vertical plane and has an annular cross-section for guiding said top section of said flange thereabout.

5. The device of claim 3, wherein said piston travels along a linear path registered orthogonally to said shaft.

6. A mouse pad for use with computer peripherals and the like, said mouse pad comprising:
    a body including planar top and bottom surfaces having a fixed spatial relationship, said body further having a continuous and hollow cavity intercalated between said top and bottom surfaces and extending between opposed end portions of said body;

a rotatable flange having a dome shape suitably sized for fitting within a palm of an operator's hand, wherein said flange is offset from a center of said body, said flange having a bottom section statically and directly conjoined to said top surface of said body, said flange further having a top section directly and rotatably conjoined to said bottom section wherein the operator can selectively bias said top section of said flange about a vertical axis registered orthogonal to said body, said bottom section having a diameter greater than said top section for supporting said top section upwardly and away from said top surface of said body;

means for heating said flange during operating conditions, said heating means being directly connected to said top section of said flange and including a controller directly conjoined to an outer perimeter of said body; and means for oscillating said flange about a horizontal axis registered parallel to said top surface of said body such that said flange tilts side-to-side and against a bottom surface of an operator wrist during operating conditions;

wherein said heating means and said oscillating means are independently and simultaneously operable.

7. The device of claim 6, wherein said heating means comprises:

a voltage regulator electrically coupled to said controller; and a heating element electrically coupled to said voltage regulator, said heating element being channeled through said cavity and upwardly into said flange wherein said heating element terminates within said top section of said flange;

wherein said controller is electrically coupled to an external power supply source and is responsive to a user input, said controller generating and transmitting a control signal to said voltage regulator for controlling the amount of current passing to said heating element and thereby effectively regulating an operating temperature of said heating element as desired by the user.

8. The device of claim 6, wherein said oscillating means comprises:

a controller electrically and directly coupled to the external power supply source;

a motor and an associated piston directly conjoined thereto, said motor being selectively operable in such a manner that said piston is caused to extend and retract along a rectilinear path between said top and bottom sections of said flange, wherein said motor is directly attached to said bottom section of said flange and said piston is telescopically engageable with said top section of said flange;

a switch seated medially of said controller and said motor, said switch interrupting power when said controller is toggled to an off position; and a fulcrum shaft having an elongated and rectilinear length oriented parallel to said bottom section of said flange, said shaft being intercalated between said top and bottom sections of said flange such that said top section of said flange is caused to articulate about said shaft when said piston is biased between extended and retracted positions respectively.

9. The device of claim 8, wherein said shaft is registered orthogonal to a vertical plane and has an annular cross-section for guiding said top section of said flange thereabout.

10. The device of claim 8, wherein said piston travels along a linear path registered orthogonally to said shaft.

11. A mouse pad for use with computer peripherals and the like, said mouse pad comprising:

a body including planar top and bottom surfaces having a fixed spatial relationship, said body further having a continuous and hollow cavity intercalated between said top and bottom surfaces and extending between opposed end portions of said body;

a rotatable flange having a dome shape suitably sized for fitting within a palm of an operator's hand, wherein said flange is offset from a center of said body, said flange having a bottom section statically and directly conjoined to said top surface of said body, wherein said flange is seated adjacent to a proximal edge of said body, said flange further having a top section directly and rotatably conjoined to said bottom section wherein the operator can selectively bias said top section of said flange about a vertical axis registered orthogonal to said body, said bottom section having a diameter greater than said top section for supporting said top section upwardly and away from said top surface of said body;

means for heating said flange during operating conditions, said heating means being directly connected to said top section of said flange and including a controller directly conjoined to an outer perimeter of said body; and means for oscillating said flange about a horizontal axis registered parallel to said top surface of said body such that said flange tilts side-to-side and against a bottom surface of an operator wrist during operating conditions;

wherein said heating means and said oscillating means are independently and simultaneously operable.

12. The device of claim 11, wherein said heating means comprises:

a voltage regulator electrically coupled to said controller; and a heating element electrically coupled to said voltage regulator, said heating element being channeled through said cavity and upwardly into said flange wherein said heating element terminates within said top section of said flange;

wherein said controller is electrically coupled to an external power supply source and is responsive to a user input, said controller generating and transmitting a control signal to said voltage regulator for controlling the amount of current passing to said heating element and thereby effectively regulating an operating temperature of said heating element as desired by the user.

13. The device of claim 11, wherein said oscillating means comprises:

a controller electrically and directly coupled to the external power supply source;

a motor and an associated piston directly conjoined thereto, said motor being selectively operable in such a manner that said piston is caused to extend and retract along a rectilinear path between said top and bottom sections of said flange, wherein said motor is directly attached to said bottom section of said flange and said piston is telescopically engageable with said top section of said flange;

a switch seated medially of said controller and said motor, said switch interrupting power when said controller is toggled to an off position; and a fulcrum shaft having an elongated and rectilinear length oriented parallel to said bottom section of said flange, said shaft being intercalated between said top and bottom sections of said flange such that said top section of said flange is caused to articulate about said shaft when said piston is biased between extended and retracted positions respectively.

14. The device of claim 13, wherein said shaft is registered orthogonal to a vertical plane and has an annular cross-section for guiding said top section of said flange thereabout.

15. The device of claim 13, wherein said piston travels along a linear path registered orthogonally to said shaft.

* * * * *